United States Patent Office 3,270,415
Patented Sept. 6, 1966

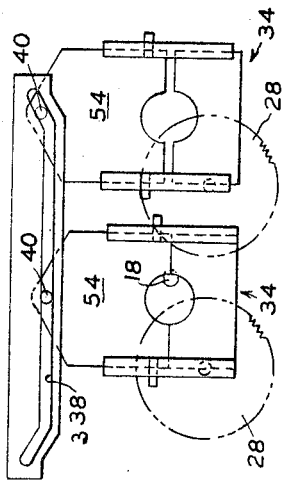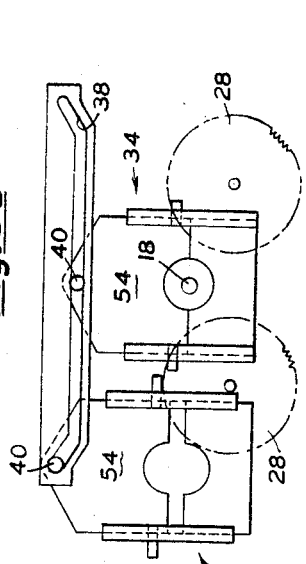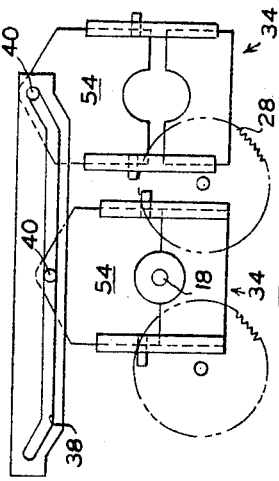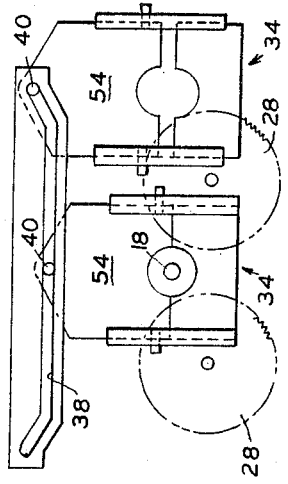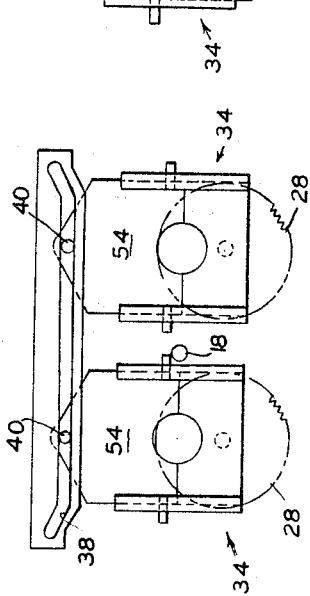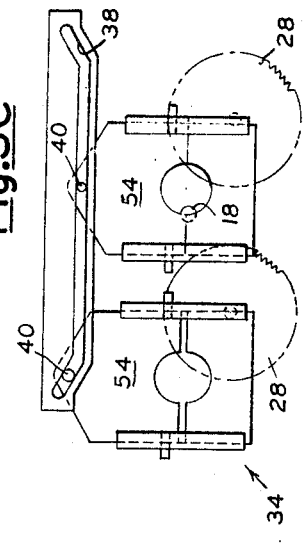
INVENTOR.
JULIUS LAKATOS
BY Ralph R. Roberts
AGENT

3,270,415
TRIMMING APPARATUS FOR MOLDED
ARTICLES
Julius Lakatos, 647 Lincoln Ave., Maywood, N.J.
Filed Oct. 13, 1964, Ser. No. 403,613
10 Claims. (Cl. 29—558)

This invention relates to the apparatus for and the method of trimming molded articles. More particularly this invention relates to apparatus for and the method of grasping, transferring, trimming and releasing plastic blow moldings and particularly bottles.

Even more particularly this invention relates to the apparatus for and the method of grasping, transferring, trimming and releasing the plastic blow moldings in which the transferring means is a reciprocating table, the grasping means is a cam actuated clamp and the trimming means is accomplished by sawing and reaming.

In the forming of molded containers and particularly those identified by the term "blow molding," it is usually necessary that certain "gate" or "overflow" portions inherent in the particular process of manufacture be removed before the molded article is considered finished. In the formation of bottles and similar containers the "gate" or "overflow" is usually at the mouth or threaded portion of the molded piece and as this is nearly always the location provided for sealing the container this surface presented to a mating cap or closure must be finished within close limits. The process of producing such a sealing surface requires a finishing operation and it is an object of this invention to provide the apparatus and method for removing a "gate" or "sprue" from a molded article and for finishing the closure surface thereof so as to provide a smooth surface for pressure sealing by means of an auxiliary cap.

It is a further object of this invention to provide an apparatus and method for trimming and finishing "blow moldings" in which there are a plurality of molding clamps which may be loaded in sequence and while one clamp is being loaded and unloaded another like clamp may be grasping a molding and presenting that molding to a finishing operating sequence.

It is a further object of this invention to provide a clamping means in which there is provided automatic closing and opening means of a mold holding apparatus and in which there is provided biased retaining means which prevent unwanted crushing of improperly loaded moldings and the possible bending or breaking of mold holding apparatus.

The invention consist of the method of and the apparatus for trimming articles and having novel parts, constructions, arrangements, combinations and improvements herein shown and described.

The accompanying drawings, referred to herein and constituting a part hereof, illustrate an embodiment of the invention, and together with the description, serve to explain the principles of the invention.

In the drawings:

FIGS. 3A through 3F represent somewhat diagrammatically and in selected sequence a plan view of each sequence showing the apparatus in relative positions of operation.

Figure 1:
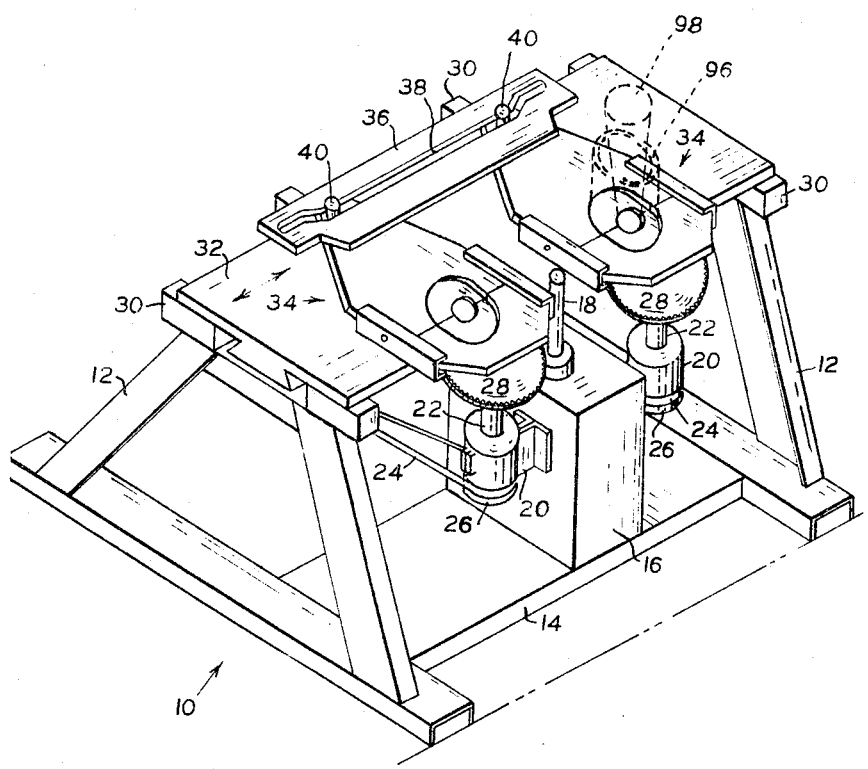
FIG. 1 represents an isometric view of the assembly of the apparatus of this invention.

The present invention provides an improved trimming apparatus which includes a table which in operation is reciprocated by conventional means such as hydraulic cylinder. Carried by this table in the preferred instance is a pair of clamp assemblies each adapted for the holding of the molded article and which are actuated by a common cam track which is fixed to the frame and in spaced relationship to the clamp assemblies. These clamp assemblies are provided with spring biased guide retainers so that if a molded article is by carelessness or inadvertence improperly inserted in a clamp assembly the clamp assembly is not damaged. As the table is reciprocated the "gate" of the molding is brought in the way of a rotating circular saw by which means the "gate" is cut off. At the end of the table reciprocation the cut face of the molding is further machined by the advancement of a rotating reamer against the face produced by sawing of the molded article. The table is then returned to the other end of reciprocation where the cam track causes a portion of the clamp assembly to move apart so as to open the mold retaining portion to release the now finished molded article and permit the insertion of another to-be-trimmed molded article.

It will be understood that the foregoing general description and the following detailed description as well are exemplary and explanatory of the invention but are not restrictive thereof.

Referring now in detail to the embodiment of the invention herein shown for purposes of illustration and example in which like numbers designate like components, the trimming apparatus includes a base 10 having end frames 12 and a lower support connecting member 14 forming a part of the base. Intermediate the end frames and carried by the support member 14 is a drive unit 16 which is of conventional construction and which has a rotating spindle 18 which, in addition to rotating, also is reciprocable in that in addition to a normal repose position, the spindle is movable upwardly in response to a signal means and to remain in this up position until this signal ceases whence the spindle returns to the normal repose position. Carried on this drive unit are two spaced bearing blocks 20 each carrying a shaft 22 which, as shown, is driven by a U-belt 24 running in a sheave 26 on one end of shaft 22, the U-belt 24 being driven by a conventional power source not shown. Mounted on the other end of shaft 22 is a saw blade 28 which is rotated as shaft 22 is rotated. In the present embodiment these saw blades are movable to a predetermined height to suit a particular molding to be trimmed and at this height are locked for the duration of the run or until it is desired to move them to a different height.

The upper portion of each end frame 12 carries one end of a table support 30 which includes dovetail guideways. Reciprocally movable in and carried by the guideways of support 30 is clamp table 32 which in the present embodiment is moved by a hydraulic cylinder (not shown). Carried on this table are two clamp assemblies 34 which will be more fully described below. The opening and closing of these assemblies is by means of a cam plate 36 removably attached to frame 30. As exemplified this cam plate has a cam track 38 having a long intermediate straight portion. Extending from each end of this intermediate portion is a sloped or angled portion, each angled portion diverging at substantially equal angles to the intermediate portion. The angled portion may terminate in a short straight portion which is parallel to the intermediate straight portion of the cam track. The function of the cam track will be more fully described in the description of the operation sequence covered by FIGS. 3A to 3F. Engaging the cam track 38 and moved in response thereto is a cam follower 40 which is carried by the clamp assembly 34.

Figure 2:
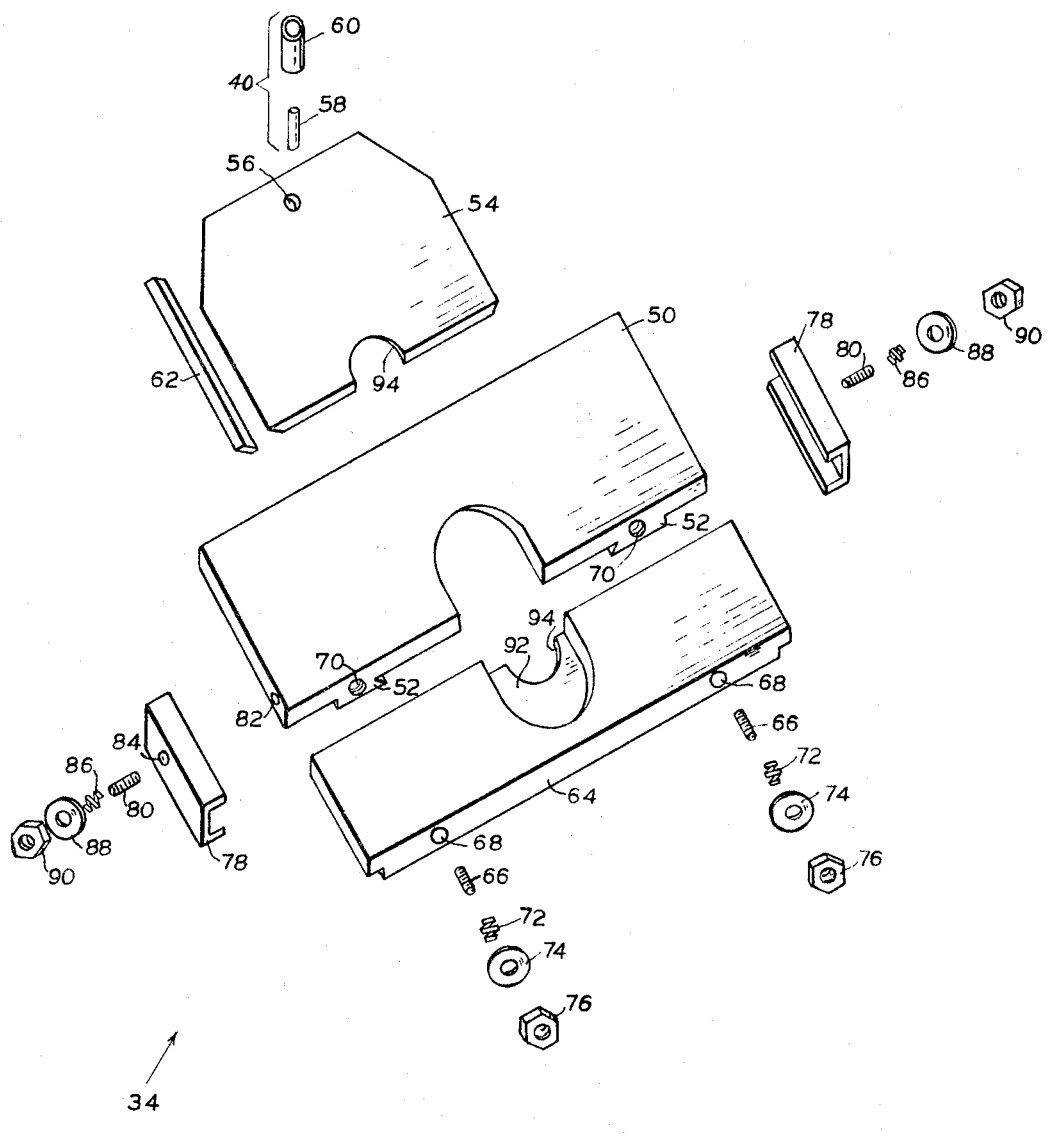
FIG. 2 represents an exploded isometric view of the clamp elements forming the clamp apparatus of this invention.

Referring now to the clamp assembly 34 and in particular to FIG. 2, the preferred example of clamp assembly 34 includes a main plate 50 which is provided with dovetail guides 52. Carried in these dovetail guides is rear clamp plate 54 having a hole 56 for retaining and carrying the cam follower assembly 40 which may have a cam follower pin 58 and having a roller 60 mounted on the pin 58. The adjustment of the dovetail guides 52 for the accommodation of the plate 54 is by means of a gib key 62 carried between plate 54 and guide 52.

A front clamp plate 64 is attached to the main plate 50 and is retained in a preselected relationship and in an adjustable spring biased retention by means of studs 66 extending through guideways 68 in front clamp plate 64 and into threaded holes 70 in main plate 50. A preselected spring bias is provided by means of compression springs 72 carried on studs 66 and adjusted into the desired compression by means of washer 74 urged inwardly by nut 76 as it is threaded on stud 66.

A spring bias means is also provided so that front clamp plate 64 may move transversely in relation to main plate 50. This spring bias is provided by means of clamp guides 78 retained by main plate 50 by means of studs 80 threaded into holes 82 in the main plate. The clamp guides are slidable on stud 80 by means of hole 84 in clamp guides 78 and the guides are biased inwardly by compression springs 86 tensioned by washer 88 urged inwardly by nut 90 as it is threaded on stud 80.

It is to be noted that a shelf 92 is provided in front clamp plate 64. This shelf is on the same plane as the top surface of rear clamp plate 54 and both plate 54 and plate 64 may be provided with arcuate portions 94 adapted to grip the neck portion of the bottle to be trimmed. Further clamping and support means adapted to the specific article to be trimmed may be attached to the shelf 92 and to the upper exposed surface of rear plate 54. Such a split clamp 96 is suggested in phantom outline in FIG. 1, this clamp holding article 98 also in phantom outline.

Operation

Referring now to FIGS. 3A through 3F, the operational sequence of trimming an article is shown as stopped motion studies at selected succeeding intervals of operation. In FIG. 3A is represented two similar clamp assemblies 34 with the assembly on the left, as shown, being in the closed position and over the spindle 18 where the article to be finished is reamed by a tool mounted on the spindle 18. The right hand assembly 34 is open for loading and unloading of an article to be trimmed. It is to be noted that the cam follower 40 of the left assembly is intermediate the cam track 38 and in this position urges the rear clamp plate 54 into the forward or closed position while the right assembly is urged into an open position by the rearwardly directed movement of cam follower 40 as deflected by the angular end portion of cam track 38. The table 32 (FIG. 1) is at the left end of its movement.

FIG. 3B represents the apparatus at a later point of operation in which the left clamp assembly 34 has been moved to the left of spindle 18 while still being in the closed position provided by cam follower 40 in cam track 38. The right clamp assembly 34 is starting to close as dictated by cam follower 40 being moved up the inclined slope of cam track 38. The article carried in this right clamp assembly 34 is approaching the right saw blade 28.

FIG. 3C represents the apparatus at a later point of operation in which the left and right clamp assemblies 34 are in the closed positions as provided by the cam followers 40 positioned in the forward portion of the cam track 38. The article in the left assembly has been carried even further to the left while the article carried in the right clamp assembly 34 has been brought in the way of and through a portion of the right saw blade 28 and the "gate" or "sprue" has been sawed off and allowed to fall from the article.

FIG. 3D represents the apparatus at a still later point of operation in which the table 32 as seen in FIG. 1 has been moved to the extreme right so that the cam follower 40 of the left clamp assembly has been moved rearwardly by the sloped portion of the cam track 38 thus opening the left clamp assembly 34 for the removal of a finished article and the loading therein of an unfinished article. Meanwhile the right clamp assembly has moved to a position over spindle 18 where the article retained in the clamp is finished by means of the reamer mounted thereon.

FIG. 3E represents the apparatus at a still later point of operation in which the table 32 has started to move to the left and the left clamp assembly 34 has begun to close as urged by the cam follower 40 in the sloped portion of the cam track 38. The right clamp assembly 34 is closed and the finished article is being moved away from the spindle 18 and over the right saw blade 28 while the left assembly 34 approaches the left saw blade 28.

FIG. 3F represents the apparatus as it has completed one reciprocation and has returned to the position of FIG. 3A. The apparatus is now ready to repeat the above cycle in which, as shown in the present embodiment, two articles in one reciprocation of the apparatus are trimmed by saws 28 and in sequence to a ream finishing operation of the sawed ends.

It is to be noted that in FIG. 1 the cam plate 36 is made with a cam track 38 having short straight terminal portions which provides a time dwell for the opening and/or closing of clamp assembly 34. As shown in FIGS. 3A through 3F the cam track 38 has no such straight terminal portion, the time dwell desired being provided by the cycling mechanism. Cam plate 36 is desirably made removable from table support 30 so that a cam track 38 can be specifically provided for the precise timing of the cutting, finishing and loading of the clamp assembly. The dwell portions are a specific function of the length of the straight portions.

Process

It is to be noted that the above operation of the apparatus provides for a new and novel method of trimming blow moldings and in particular those identified as flexible or "squeeze" type bottles. The method of trimming these articles include the steps of loading an article to be trimmed into the holding means of a biased clamp assembly; advancing the article to a ream finishing operation of the prior sawed surface of the article and unloading the finished article from the biased clamp assembly.

It is to be noted that the terms "right" and "left" and "in" and "out" and "up" and "down" and similar terms are applicable to the apparatus as described in conjunction with the accompanying drawings and that such terms are merely for the purpose of description and do not necessarily apply to a position in which the apparatus or method may be used.

The invention in its broader aspects is not limited to the method and specific combinations shown and described but departures may be made therefrom within the scope of the accompanying claims, without sacrificing its chief advantages.

What is claimed is:

1. Apparatus for molded and similar articles for the removal therefrom of certain unwanted portions and to provide a finished surface on the article surface formed by the removal of the unwanted portion, the apparatus comprising: (1) a base including a table support; (2) a table carried by this base and reciprocably movable in guide means provided on the support; (3) at least one clamp assembly carried by the reciprocable table; (4) a cam track mounted on the table support; (5) a cam follower on the clamp assembly and engaging said cam track whereby as the table is reciprocated the clamp assembly is caused to open and close; (6) means for cutting the unwanted portions from the article; and (7) means for finishing the surface of the article at the location of removal of the unwanted portion.

2. Apparatus according to claim 1 in which the means for cutting is a rotating saw disposed so as to be in the way of the article as it is reciprocated.

3. Apparatus according to claim 2 in which the means for finishing the surface of the article is a reamer movable toward and away from the article in response to a signal generated by the location of the clamp assembly in relation to the base.

4. Apparatus according to claim 3 in which the clamp assembly includes a main plate and a front clamp plate, said front clamp plate being held in a predetermined relationship to the main plate by a bias means, said bias means being adjustable to permit transverse and longitudinal movement of the front clamp plate in relationship to the main plate in the event of improper loading of the clamp assembly.

5. A clamp assembly for holding molded and similar articles for trimming and finishing, said assembly comprising: (1) a main plate having guideways thereon; (2) a rear clamp plate movable in and retained by said guideways; (3) a front clamp plate held in predetermined relationship to the main plate by biased means providing both transverse and longitudinal movement of the front clamp plate; (4) means for moving the rear clamp plate to and away from the front clamp plate; and (5) means on the front and rear clamp plate for removably retaining the article to be trimmed.

6. A clamp assembly according to claim 5 in which the bias means for holding the front plate to the main plate includes a pair of clamp guides slidable on studs extending from the sides of the main plate and adapted to engage the main plate and front plate; a compression spring slidable on the stud and disposed to engage the exterior surface of the clamp guide; an adjustable retaining means on the stud and adapted to engage and compress said spring so as to urge the clamp guide toward the main plate by a predetermined bias; at least one stud extending from the front of the main plate and freely slidable in a hole in the front plate; a compression spring slidable on the stud; and an adjustable retaining means on the stud and adapted to engage and compress said spring so as to urge the front plate toward the main plate by a predetermined bias.

7. A clamp assembly according to claim 6 in which a split clamp is removably mounted thereon, one half of the split clamp being removably attached to the rear clamp plate and the other half of the split clamp being removably attached to the front clamp plate.

8. A clamp assembly according to claim 7 in which the means for moving the rear clamp plate is a cam follower engaging a cam track, said cam follower being mounted on the rear clamp plate.

9. The method of trimming and finishing molded articles comprising the steps of:
 (1) clamping an article to be trimmed in a holding means;
 (2) advancing the holding means and article to a cutting apparatus to sever the article and unwanted portion thereof;
 (3) moving the article through the cutting means in the way of the path of travel of the article;
 (4) advancing the cut article to a finishing station;
 (5) finishing the cut surface by advancing a rotating cutting tool to the cut surface of the article;
 (6) returning the holding means to the clamping station; and
 (7) unclamping the article from the holding means.

10. The method of trimming and finishing molded and similar articles in which certain portions formed in the process of manufacture are to be removed and the resulting surface is to be finished, the method comprising the steps of:
 (1) opening a cam operated article holding means in response to the movement of a cam follower moving in a cam track;
 (2) loading an article to be trimmed in the article holding means;
 (3) closing the cam operated article holding means in response to the movement of a cam follower moving in a cam track;
 (4) advancing the article to and through a cutting means in the way of the path of travel of the article;
 (5) advancing the cut article to a finishing station;
 (6) finishing the cut surface by advancing a rotating cutting tool to the cut surface of the article;
 (7) returning the holding means to the clamping station;
 (8) opening the cam operated article holding means in response to the movement of a cam follower moving in a cam track; and
 (9) unloading the finished article from the open article holding means.

References Cited by the Examiner
UNITED STATES PATENTS

| | | | |
|---|---|---|---|
| 1,460,286 | 6/1923 | Stenhouse | 29—559 |
| 2,076,436 | 4/1937 | Nelson | 29—558 |
| 2,320,814 | 6/1943 | Cudini | 29—559 |
| 2,612,082 | 9/1952 | Angell et al. | 29—559 |
| 3,187,635 | 6/1965 | Koss | 29—558 |

JOHN F. CAMPBELL, *Primary Examiner.*

THOMAS H. EAGER, *Examiner.*